United States Patent [19]

Hayasaki

[11] Patent Number: 5,090,271
[45] Date of Patent: Feb. 25, 1992

[54] SHIFT CONTROL SYSTEM FOR AUTOMATIC TRANSMISSION

[75] Inventor: Koichi Hayasaki, Fujisawa, Japan

[73] Assignee: Nissan Motor Co., Ltd., Yokohama, Japan

[21] Appl. No.: 377,940

[22] Filed: Jul. 11, 1989

[30] Foreign Application Priority Data

Jul. 11, 1988 [JP] Japan ................................ 63-170790

[51] Int. Cl.⁵ .............................................. B60K 41/06
[52] U.S. Cl. ......................................... 74/869; 74/866
[58] Field of Search .................. 74/866, 869, 867, 868

[56] References Cited

U.S. PATENT DOCUMENTS

| | | | |
|---|---|---|---|
| 4,334,441 | 6/1982 | Iwanaga et al. | 74/869 X |
| 4,602,529 | 7/1986 | Sugano | 74/869 |
| 4,680,992 | 7/1987 | Hayasaki et al. | 74/869 |
| 4,726,262 | 2/1988 | Hayakawa et al. | 74/866 |
| 4,727,773 | 3/1988 | Sumiya et al. | 74/867 |
| 4,763,545 | 8/1988 | Shibayama et al. | 74/866 X |
| 4,787,258 | 11/1988 | Yamamoto et al. | 74/866 |
| 4,807,496 | 2/1989 | Hayasaki et al. | 74/866 |
| 4,843,920 | 7/1989 | Hayasaki et al. | 74/867 X |
| 4,924,731 | 5/1990 | Hayakawa et al. | 74/867 X |

OTHER PUBLICATIONS

Nissan Full-Range Automatic Transmission Re4R01A Type, Service Manual, (A261C07), issued on Mar. 1987 by Nissan Motor Co., Ltd.

Primary Examiner—Leslie A. Braun
Assistant Examiner—Benjamin Levi
Attorney, Agent, or Firm—Foley & Lardner

[57] ABSTRACT

A shift control system for an automatic transmission comprises a plurality of timing valves which are directly under the control of a single solenoid.

4 Claims, 4 Drawing Sheets

3→2 DOWNSHIFT

4→2 DOWNSHIFT

3→2 DOWNSHIFT

4→2 DOWNSHIFT

SHIFT CONTROL SYSTEM FOR AUTOMATIC TRANSMISSION

BACKGROUND OF THE INVENTION

The present invention relates to a shift control system for an automatic transmission.

U.S. Pat. No. 4,680,992 issued to Hayasaki et al., on July 21, 1987 discloses a shift control system for an automatic transmission. This known shift control system comprises a 3-2 timing valve, an overrunning clutch control valve, a shuttle valve, and a solenoid. The solenoid generates a solenoid pressure under the control of a control unit. The shuttle valve communicates with the timing valve, overrunning clutch control valve, and solenoid. It comprises a valve spool or valve element movable responsive to a line pressure that is variable with the engine throttle opening (viz., engine load) between a first position where the overrunning clutch control valve is under the control of the solenoid pressure while the 3-2 timing valve is not under the control of the solenoid pressure, and a second position where said overrunning clutch is not under the control of the solenoid pressure while the 3-2 timing valve is under the control of the solenoid pressure. The automatic transmission of this type is described in a publication "NISSAN FULL-RANGE AUTOMATIC TRANSMISSION RE4R01A TYPE, SERVICE MANUAL, (A261C07) issued on Mar.1987 by Nissan Motor Co., Ltd.

An object of the present invention is to provide an automatic transmission provided with a hydraulic control system wherein a plurality of valves are controlled by a solenoid without any valve therebetween.

SUMMARY OF THE INVENTION

According to one aspect of the present invention, there is provided a shift control system for an automatic transmission, the shift control system including; a plurality of valves which are to play their roles in different control phases, respectively; a solenoid; and means for allowing said solenoid to control said plurality of valves.

According to a specific aspect of the present invention, there is provided a shift control system for an automatic transmission, the shift control system including; a plurality shift timing valves which are to control timings of different shifts in speed ratio, respectively; a solenoid; and means for allowing said solenoid to control said plurality of valves.

DETAILED DESCRIPTION OF THE INVENTION

Figure 1A:
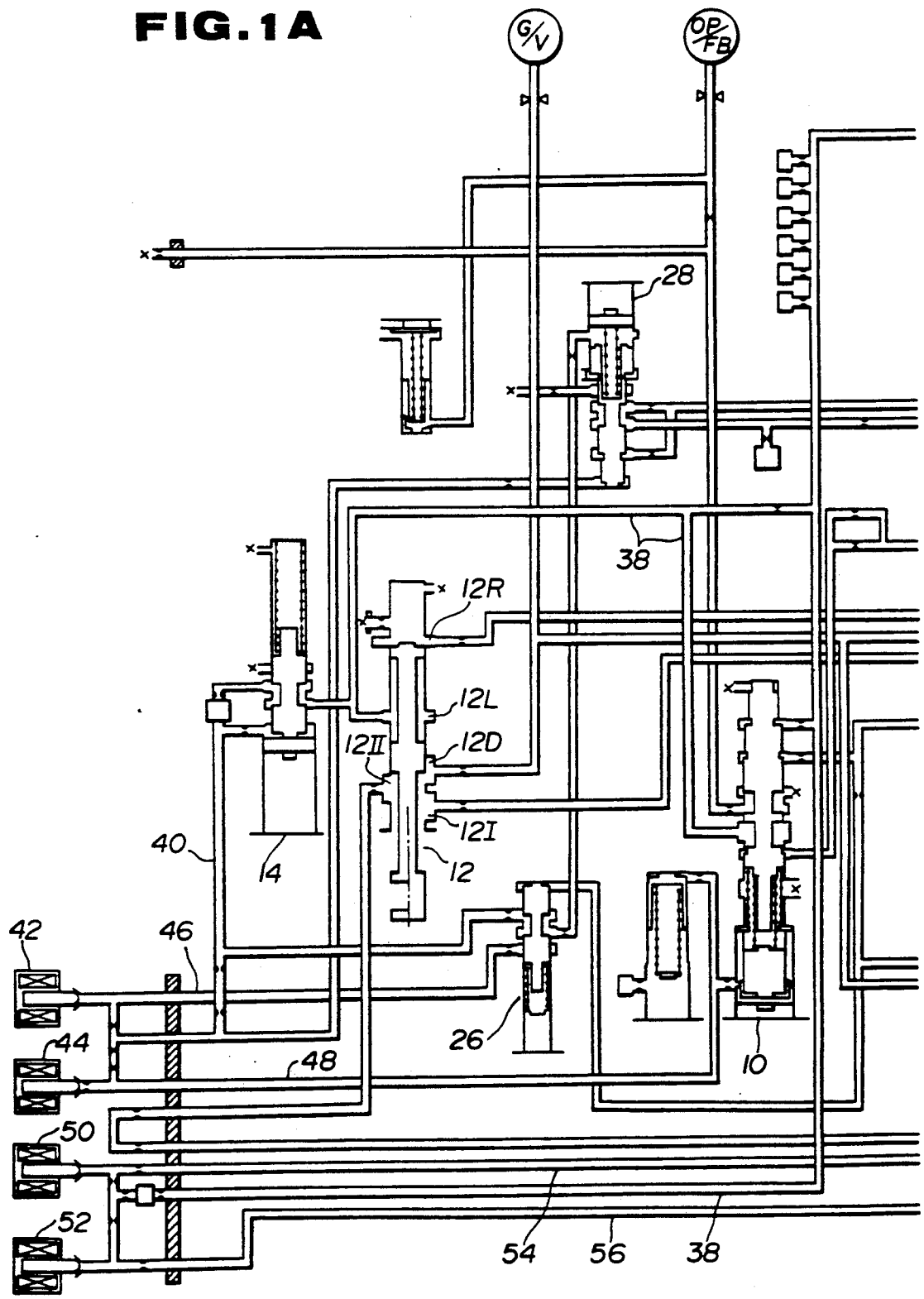
FIGS. 1A and 1B, when combined, are a hydraulic circuit diagram of a hydraulic control system, including a shift control system, for an automatic transmission.
Figure 1B:
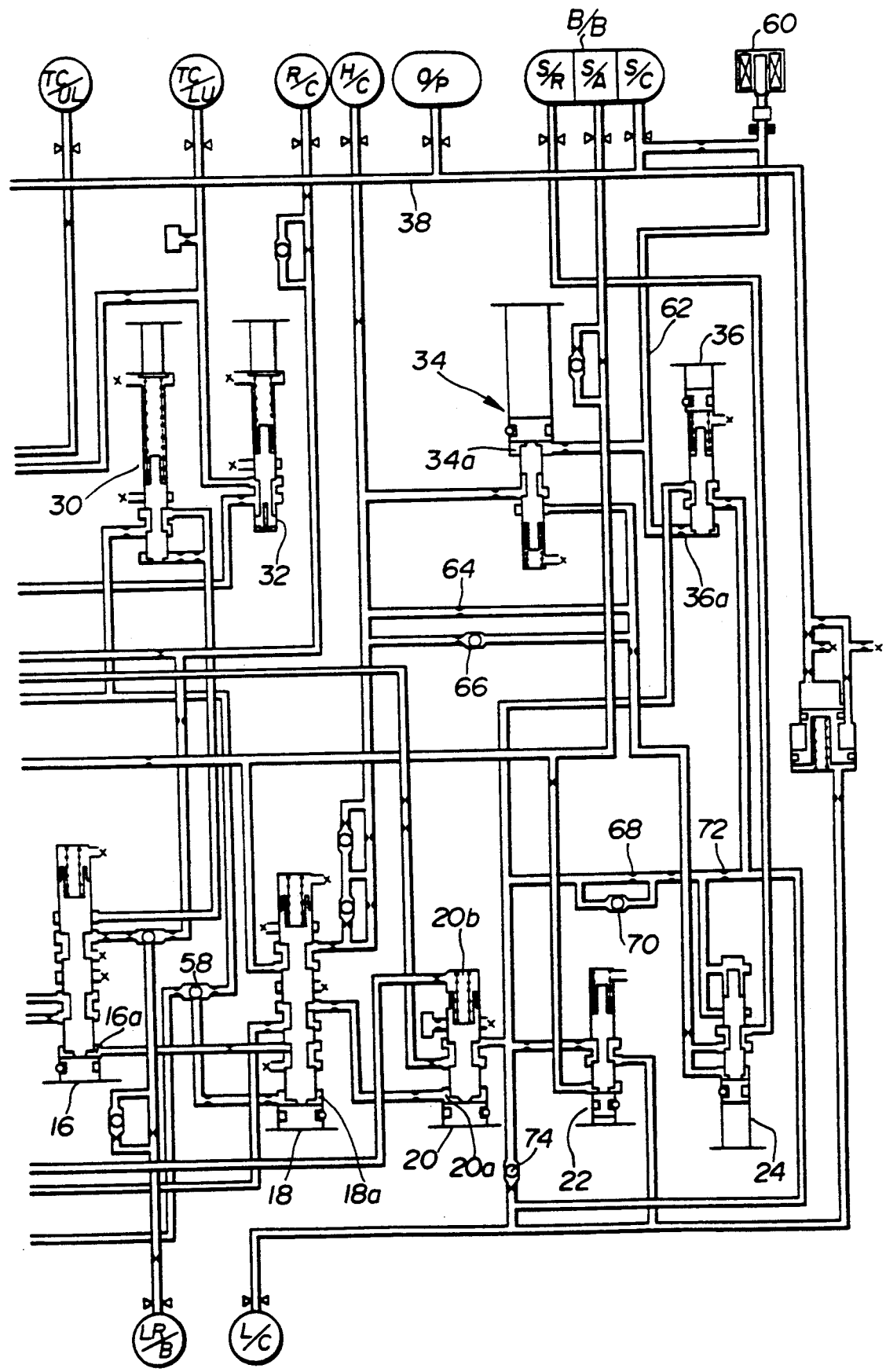

Referring to FIGS. 1A and 1B, a hydraulic control system for an automatic transmission is described. The automatic transmission also includes a power train, not shown. This power train is substantially the same as a power train used in a known automatic transmission of the RL4F02A type manufactured in Japan by Nissan Motor Co., Ltd. and described in a publication "SERVICE MANUAL FOR AUTOMATIC TRANSMISSIONS OF THE RN4F02A TYPE AND RL4F02A TYPE (A261C06)" issued by Nissan Motor Co., Ltd. on Feb. 1984. The hydraulic control system includes a shift control system according to the present invention.

The automatic transmission is shiftable in speed ratio under the control of the shift control system and includes a low clutch (L/C), a band brake (B/B), a high clutch (H/C), a low reverse brake (LR/B) and a reverse clutch (R/C). Among these friction elements, one or a plurality of them selected are applied or engaged hydraulically in each of speed within a given drive range in accordance with a schedule as illustrated in Table 1 below. (Circles in the Table stand for supply of hydraulic fluid pressure.)

TABLE 1

|   | R/C | H/C | L/C | B/B S/A | B/B S/R | LR/B |
|---|---|---|---|---|---|---|
| P |   |   |   |   |   |   |
| R | o |   |   |   |   | o |
| N |   |   |   |   |   |   |
| <u>D</u> |   |   |   |   |   |   |
| 1st. |   |   | o |   |   |   |
| 2nd. |   |   | o | o |   |   |
| 3rd. |   | o | o | o | o |   |
| 4th. (OD) |   | o |   | o |   |   |
| <u>II</u> |   |   |   |   |   |   |
| 1st. |   |   | o |   |   |   |
| 2nd. |   |   | o | o |   |   |
| <u>I</u> |   |   |   |   |   |   |
| 1st. |   |   | o |   |   | o |
| 2nd. |   |   | o | o |   |   |

The ranges, from which the vehicle's driver will select one by manipulating a selector of a manual valve to be mentioned later, are "P" for parking, "R" for reverse, "N" for neutral (rest), "D" for automatic forward drive, "II" for second speed engine brake running, and "I" first for speed engine brake running. The band brake includes a servo apply chamber (SA), a servo release chamber (S/R), and a servo accumulator chamber (S/C) as shown in FIG. 1. The brake is applied when pressure is supplied to the servo apply chamber (SA), and is released when pressure is supplied to the servo release chamber regardless of the presence or absence of pressure in the servo apply chamber. The hydraulic control system illustrated in FIGS. 1A and 1B is supplied with hydraulic fluid by an engine-driven oil pump. The oil pump is controlled by pressure supplied to an oil pump feedback chamber (OP/FB) (shown separated from the oil pump for convenience in FIG. 1A) so that the pump maintains an appropriate value in capacity. The circuit indicated in FIG. 1 serves for the purpose of lock-up control of a torque converter as well as for speed change. The torque converter consists of a torque converter lock-up chamber (TC/LU) and torque converter unlock-up chamber (TC/UL). When hydraulic fluid is supplied to the lock-up chamber (TC/LU) and drained through the unlock-up chamber (TC/UL), the torque converter assumes a lock-up condition, and when the fluid flows in the opposite direction it assumes a converter condition. The circuit of FIG. 1 is basically the same as that described in the above-mentioned service manual, comprising a regulator valve 10, a manual valve 12, a pilot valve 14, 1-2 shift valve 16, 2-3 shift valve 18, 3-4 shift valve 20, select timing valve 22, servo release timing valve 24, a lock-up shuttle valve 26, lock-up a control valve 28, "I" range pressure reduction valve 30, a torque converter pressure adjusting valve 32, 3-2 a timing valve 34, a low clutch timing valve 36, and a governor valve G/V.

The regulator valve 10 is designed to adjust pressure of fluid from the oil pump O/P, and provides the conduit 38 with line pressure. The line pressure is directed to an inlet port 12L of the manual valve 12, which valve permits no line pressure to flow to any port when "N" or "P" position is selected. The manual valve allows pressure to be furnished to a port 12R with "R" range selected, to a port 12D with "D" chosen, to ports 12D and 12 II when "I" is selected, and to ports 12D, 12 II and 12 I when "II" is selected, thus providing a driving condition for each range chosen. The pilot valve 14 performs to give to a conduit 40 certain pilot pressure which is determined by the force of a spring incorporated in the pilot valve.

A duty type lock-up solenoid 42 and line pressure solenoid 44 give to conduits 46 and 48 a certain pressure which is based upon the aforesaid pilot pressure and adapted according to drive duty. The lock-up solenoid 42 serves to adjust the degree of lock-up, providing a slip control while the torque converter is in a lock-up condition, and the line pressure solenoid 44 works for proper control of line pressure by directing to the regulator valve 10 pressure according to drive duty, in order to shift the valve upward as viewed in FIG. 1.

The 1-2 shift valve 16, 2-3 shift valve 18 and 3-4 shift valve 20 are controlled by "ON-OFF" type first shift solenoid 50 and second shift solenoid 52. When the solenoids 50 and 52 are held "ON", line pressure in the conduit 38 is supplied to the conduits 54 and 56; when the solenoids are "OFF", the conduits 54 and 56 are drained and the conduit 56 are allowed to communicate with a pilot chamber 18a of the 2-3 shift valve 18 via the shuttle valve 58. The conduit 54 is permitted to communicate, depending on the position of the 2-3 shift valve 18, with a pilot chamber 20a of the 3-4 shift valve 20 or a pilot chamber 16a of the 1-2 shift valve 16, so that each of the shift valves 16 and 20 is activated according to pressure within their respective pilot chambers 16a and 20a. The pilot chamber 18a is also provided with a "I" range pressure reaching from the manual valve port 12I through the shuttle valve 58. The chamber 20b at the opposite end of the 3-4 shift valve 20 is supplied with "II" range pressure from a port 12II of the manual valve 12.

According to the present invention, both the 3-2 timing valve 34 and low clutch timing valve 36, each of which functions as a shift valve at different control phases or times, are controlled by a timing solenoid 60. When the solenoid 60 is held "ON", line pressure from the conduit 38 is directed to pilot chambers 34a and 36a. Normally, the 3-2 timing valve 34 is closed, and when pressure is supplied to the pilot chamber 34a it becomes open. Normally, the low clutch timing valve 36 is open, and if pressure is provided to the pilot chamber 36a, it is closed.

As is clearly seen from Table 1, the 3-2 timing valve 34 is for causing an appropriate delay in releasing the servo release (S/R) from pressure to be made for a third to second downshift change. The valve 34, therefore, has in parallel a one-way orifice composed of an orifice 64 and a check valve 66. Also, the low clutch timing valve 36 is for causing an appropriate delay in the function of the low clutch (L/C) to be made for a downshift change from the fourth speed. Therefore, the valve has in parallel a conduit wherein a one-way orifice (composed of an orifice 68 and a check valve 70) and an orifice 72 are connected in series.

The following is an explanation of the operation of the above-mentioned embodiment:

When the vehicle's driver sets the manual valve 12 to "D" range, seeking an automatic forward shift driving, pressure is directed from the manual valve port 12D to related conduits. Under this condition, a combination of "ON" and "OFF" of the shift solenoids 50 and 52, as shown in Table 2 below, allows the automatic transmission to select first through fourth speeds.

TABLE 2

|  | 1st. Shift Sol. 50 | 2nd. Shift Sol. 52 |
|---|---|---|
| 1st. | ON | ON |
| 2nd. | OFF | ON |
| 3rd. | OFF | OFF |
| 4th. | ON | OFF |

At the time when line pressure starts flowing from the manual valve port 12D with "N" range shifted to "D", the shift solenoids 50 and 52 are both held "ON". Solenoid pressure furnished to the conduit 56 when the solenoid 52 is "ON" will reach the 2-3 shift valve port 18a and act to displace the valve 18 upward as viewed in FIG. 1. Consequently, the shift valve 18 provides the pilot chamber 16a of the 1-2 shift valve 16 with solenoid pressure delivered to the conduit 54 with the shift solenoid 50 held "ON" so that the valve 16 is shifted upward, and causes the pilot chamber 20a of the 3-4 shift valve 20 to be drained in order to move the valve 20 downward. Thus the shift valve 20 gives to the low clutch L/C line pressure from the port 12D, via the select timing valve 22, and orifices 68 and 72 so as to activate the low clutch L/C. In operation, if the fluid temperature is low the low clutch timing valve 36 is made to open with the timing solenoid 60 held "OFF", and line pressure is furnished to the low clutch also through the valve 36 and this keeps the low clutch from delaying in action owing to low temperature (high viscosity). When the temperature is high, the low clutch timing valve 36 is closed with the timing solenoid 60 "ON" so that no select shock is produced at the time of buildup of low clutch pressure. All the other friction elements except the low clutch L/C are deactivated because the manual valve 12, 1-2 shift valve 16 and 2-3 shift valve 18 are in the aforesaid stroke positions, and as is seen from Table 1, the first speed is chosen and the vehicle is now able to start at the first speed.

When the vehicle shifts into an operating state which demands the automatic transmission to upshift to the second speed, the first shift solenoid 50 is rendered OFF in accordance with the schedule shown in Table 2. This causes solenoid pressure that is to reach a pilot chamber 16a of the 1-2 shift valve 16 from the circuit 54 to disappear, allowing the 1-2 shift valve 16 to stroke downwards as viewed in FIGS. 1A and 1B. This movement of the 1-2 shift valve 16 allows the line pressure from the port 12D of the manual valve 12 to be supplied to the servo apply chamber S/A, causing application of the band brake B/B in addition to engagement of low clutch L/C, thus making a selection of the second speed as is readily understood from Table 1.

When the vehicle shifts into another operating state which demands the automatic transmission to upshift to the third speed, the second shift solenoid 52 is also rendered OFF in accordance with the schedule shown in Table 2. This causes solenoid pressure that is to reach a pilot chamber 18a to disappear, allowing the 2-3 shift valve 18 to stroke downwards as viewed in FIGS. 1A and 1B. This movement of the 2-3 shift valve 18 allows the line pressure that is transmitted to the servo apply chamber S/A to be supplied to the high clutch H/C, causing engagement of the high clutch H/C. The high clutch activating pressure arrives past a one-way check valve 66 at a servo release timing valve 24, causing the servo release timing valve 24 to stroke upwards as viewed in FIGS. 1A and 1B when the pressure becomes greater than a predetermined value. This movement of the servo release timing valve 24 causes the pressure developed between the orifices 68 and 72 via which the pressure is transmitted from the 3-4 shift valve 20 to the low clutch L/C to be supplied to the servo release chamber S/R, causing release of the band brake B/B regardless of the presence of the servo apply chamber S/A. Thus, the third speed is selected as is clear from the Table 1.

When the vehicle shifts into an operating state which demands the fourth speed, the first shift solenoid 50 is rendered ON in accordance with the Table 2. The solenoid pressure that is outputted to the circuit 54 owing to this switching of the first shift solenoid 50 arrives past the 2-3 shift valve 18, that is disposed in the down stroked position as viewed in FIGS. 1A and 1B due to the absence of the solenoid pressure in the circuit 56, at the pilot chamber 20a of the 3-4 shift valve 20, urging the 3-4 shift valve 20 to stroke upwards as viewed in FIGS. 1A and 1B. This movement of the 3-4 shift valve 20 allows discharge of low clutch L/C activating pressure via the one-way check valve 74, causing deactivation of the low clutch L/C, and it also allows discharge of servo release chamber S/R pressure via the servo release timing valve 24 and orifice 68, causing re-application of the band brake B/B owing to the pressure within the servo apply chamber S/A. Thus, the fourth speed is selected as is clear from the Table 1.

On effecting a downshift to the third speed from this fourth speed state by switching the first shift solenoid 50, as is understood from the Table 1, the 3-4 shift valve 20 changes its state to cause activation of the low clutch L/C and release of the band brake B/B owing to the pressure supply to the servo release chamber S/R to carry out this downshift.

Figure 2A:
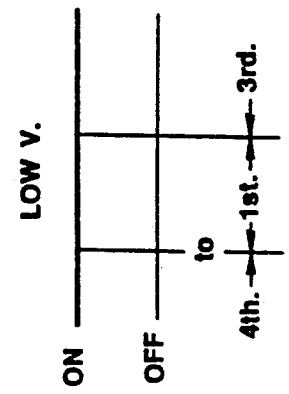
FIG. 2(a) is a time chart showing ON-OFF control of a timing solenoid during coasting 4-3 downshift at a high vehicle speed.
Figure 2B:
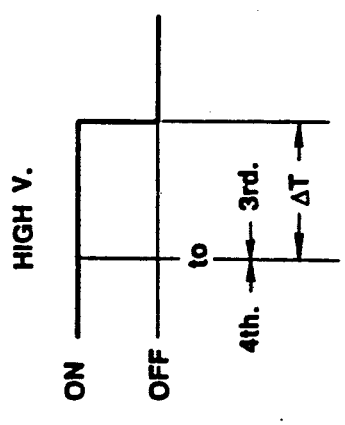
FIG. 2(b) is a time chart showing ON-OFF control of the timing solenoid during coasting 4-3 downshift at a low vehicle speed.

First, there is explained a 4-3 downshift when the vehicle is coasting. At high vehicle speed, as shown in FIG. 2(a), the timing solenoid 60 is rendered ON for a vehicle speed dependent period of time $\Delta T$ (delta T) beginning with the instant $t_0$ when a command for shifting is generated (viz., when the 3-4 shift valve 20 shifts from its upshift position its downshift position), causing the low clutch timing valve 36 to close. At low vehicle speed, as shown in FIG. 2(b) the timing solenoid 60 is kept ON even after the instant $t_0$, thus keeping the low clutch timing valve 36 closed. Since the low clutch timing valve 36 is closed, the activating pressure to be supplied to the low clutch L/C when it is to be engaged is not supplied through the low clutch timing valve 36, and thus it is supplied to the low clutch L/C through the orifices 68 and 72 at a gradual rate, thus making it possible to keep the capacity of the low clutch L/C sufficiently low during the shifting operation. This meets the capacity requirement since the capacity of the low clutch L/C demanded for the 4-3 downshift taking place at coasting is small, thus alleviating the shift shock.

Figure 3A:
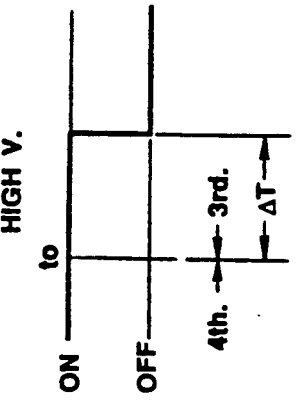
FIG. 3(a) is a time chart showing ON-OFF control of the timing solenoid during a power-on 4-3 downshift at a low vehicle speed.
Figure 3B:
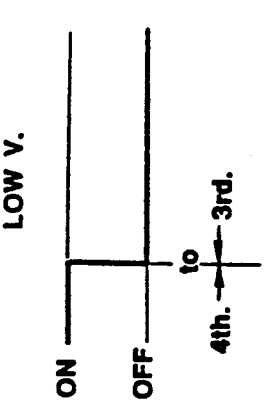
FIG. 3(b) is a time chart showing ON-OFF control of the timing solenoid during a power-on 4-3 downshift at a high vehicle speed.
Figure 4B:
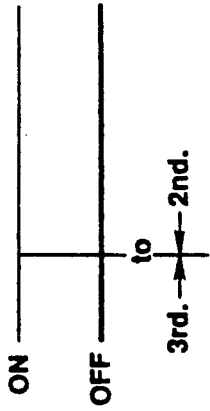
FIG. 4(b) is a time chart showing ON-OFF control of the timing solenoid during a 3-2 downshift at a high vehicle speed.

Next, there is explained a 4-3 downshift during power-on running (at acceleration). At low vehicle speeds, as shown in FIG. 3(a), the timing solenoid 60 is rendered OFF at the instant $t_0$ to cause the low clutch timing valve 36 to open, allowing a quick supply of hydraulic fluid to the low clutch L/C to activate the same quickly. At high vehicle speeds, as shown in FIG. 3(b), the timing solenoid 60 is kept rendered ON to keep the low clutch timing valve 36 closed for a vehicle speed dependent period of time $\Delta T$ (delta T) beginning with the instant $t_0$ before it is rendered OFF to cause the low clutch timing valve 36 to open, thus delaying the activation of the low clutch L/C such that the activation timing of the low clutch L/C takes place in timed relationship with the release of the band brake B/B owing to the rise in pressure within the servo release chamber (S/R). This prevents the occurence of interlock of the transmission which would occur when the low clutch L/C and the band brake B/B are simultaneously activated.

The switching of the timing solenoid during the 4-3 downshift occuring in various vehicle operating modes causes not only switching of the low clutch timing valve 36, but also switching of the 3-2 timing valve 34. However, the switching of the 3-2 timing valve 34 does not have any influence on the 4-3 downshift mentioned above since during the 4-3 downshift the pressure within the servo release chamber (S/R) is not drained as is clear from the before mentioned Table 1 because the 3-2 timing valve 34 is arranged to have influence on the discharge of hydraulic fluid from the servo release chamber (S/R).

There is effected a downshift from the third speed state where the shift solenoids 50 and 52 are both rendered OFF to the second speed state by switching the shift solenoid 52 to the ON state, and the 2-3 shift valve 20 is urged to shift upwards as viewed in FIGS. 1A and 1B, allowing drainage of pressure within the high clutch H/C and the servo release chamber S/R as shown in Table 1, effecting the 3-2 downshift required.

Figure 4A:
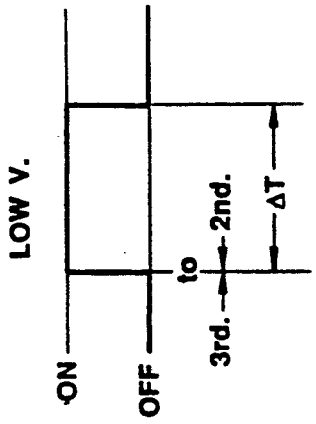
FIG. 4(a) is a time chart showing ON-OFF control of the timing solenoid during 3-2 downshift at a low vehicle speed.

In the case of the 3-2 downshift at low vehicle speeds, the timing solenoid 60 is rendered ON momentarily for a vehicle speed dependent period of time $\Delta T$ (delta T) beginning with the instant $t_0$ to urge the 3-2 timing valve 34 opened for this period of time as shown in FIG. 4(a), while in the case of the 3-2 downshift at high vehicle speeds, the timing solenoid 60 is kept OFF even after the instant $t_0$ to keep the 3-2 timing valve 34 closed. When the 3-2 timing valve 34 is opened, the pressure within the servo release chamber (S/R) is drained from the 3-2 shift valve 18 through, on one hand, the servo release chamber 24 and the orifice 64, and on the other hand, through the 3-2 timing valve 34, causing a quick release of the pressure within the servo release chamber (S/R). When the 3-2 timing valve 34 is closed, the drain through this 3-2 timing valve 34 is not allowed, causing a delay in pressure release of the pressure within the servo release chamber (S/R). As a result, the drain of the pressure within the servo release chamber (viz., the engagement of the band brake B/B) is completed at different appropriate timings for different vehicle speeds so that the neutral interval is optimized in timed with the engine revolution.

The switching of the timing solenoid 60 between ON and OFF states causes not only switching of the 3-2 timing valve 34, but also switching of the low clutch timing valve 36. However, as is clear from the Table 1, during the 3-2 downshift, supply of activating hydraulic fluid pressure toward the low clutch L/C begins so that the switching of the low clutch timing valve 34 which is arranged to have influence on the initiation of the pressure supply has no influence on the above-mentioned shifting operation.

Figure 5B:
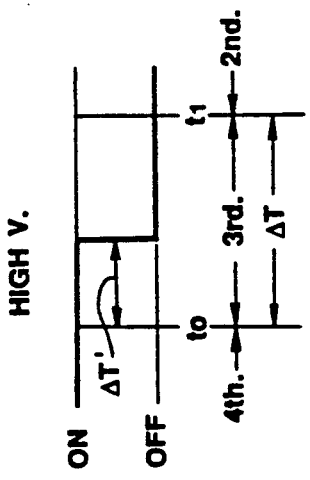
FIG. 5(b) is a time chart showing ON-OFF control of the timing solenoid during a 4-2 downshift at a high vehicle speed.
Figure 5A:
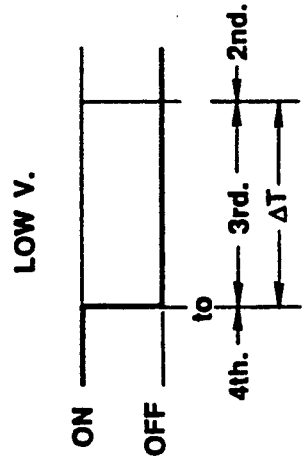
FIG. 5(a) is a time chart showing ON-OFF control of the timing solenoid during a 4-2 downshift at a low vehicle speed.

When the vehicle enters the operating condition which demands a 4-2 downshift, a downshift is made firstly to the third speed for a short stay at the third speed for a vehicle speed dependent period of time $\Delta T$ (delta T) beginning with the instant $t_0$, and then to the second speed at the instant $t_1$. In the case of the 4-2 downshift at low vehicle speeds, as shown in FIG. 5(a), the timing solenoid 60 is rendered OFF at the instant $t_0$ and kept OFF even after the instant $t_1$, while in the case of the 4-2 downshift at high speeds, as shown in FIG. 5(b), the timing solenoid 60 is kept ON for a vehicle speed dependent period of time $\Delta T'$ (delta T') beginning with the instant $t_0$ before it is rendered OFF afterwards. Thus immediately after the instant $t_0$ when 4-3 shifts is demanded, substantially the same effects as thoese described in connection with FIGS. 3(a) and 3(b) are accomplished due to the open/close control of the low clutch timing valve 36. and at the instant $t_1$ when the 3-2 shift is demanded, the neutral interval is adjusted due to the closing of the 3-2 timing valve 34.

Next, it is explained how the automatic transmission operates should the first shift solenoid 50 and/or the second shift solenoid 52 be left ON or OFF owing to the short-circuit or cut-off of the wire harness.

If the first shift solenoid 50 is left ON, the first speed or the fourth speed is established when the second shift solenoid 52 is rendered ON or OFF. If the second shift 52 is left ON, the first speed or the second speed is established when the first shift solenoid 50 is rendered ON or OFF. If both of the shift solenoids 50 and 52 are left ON, the first speed is established. If the first shift solenoid 50 is left OFF, the second speed or the third speed is established when the second shift solenoid 52 is rendered ON or OFF. If the second shift solenoid 52 is left OFF, the fourth speed or the third speed is established when the first shift solenoid 50 is rendered ON or OFF. If both of the shift solenoids 50 and 52 are left OFF, the third speed is established.

Therefore, even if the wire harness is short circuited or cut off, the automatic transmission is will not be conditioned in the neutral state where power transmission is interrupted. This means that it is no more necessary to provide excessive protection on the harness or to provide excessive strength on the shift solenoids 50 and 52. These result in cost advantage.

In these circumstances, if the driver set the manual valve 12 at the II range, the line pressure from the port 12II (II range pressure) arrives at the chamber 20b, causing the 3-4 shift valve 20 to stroke downwards, assuring establishment of the first or second or third speed. If the driver sets the manual valve 12 at the I range, the line pressure from the port 12I (I range pressure) is generated and arrives via the shuttle valve 58 at the chamber 18a, causing the 2-3 shift valve 18 to stroke upwards. This, in cooperation with the 3-4 shift valve 20 positioned in the above-mentioned upward stroke assures the first or second speed.

What is claimed is:

1. In a shift control system for an automatic transmission:

a source of a first hydraulic fluid pressure;

a plurality of valves, each having an open position wherein a fluid passage therethrough is opened and a closed position wherein said fluid passage is closed and being shiftable between said open position and said closed position, conduit means for fluidly connecting said plurality of valves to said source to allow a flow of hydraulic fluid from said source to said plurality of valves;

means including, a solenoid, for dividing said conduit means into a first section upstream thereof with respect to said flow of hydraulic fluid and a second section downstream thereof with respect to said flow of hydraulic fluid, said dividing means being operative to change said first hydraulic fluid pressure within said second section of said conduit means to a second hydraulic fluid pressure in response to said solenoid;

each of said plurality of valves having a chamber which is always in an uninterrupted communication with all elements of said dividing means through said second section of said conduit means and being shiftable between said open position and closed position in response to a change within said second section of said conduit means from said first hydraulic fluid pressure to said second hydraulic fluid pressure.

2. In a shift control system for an automatic transmission:

a source of a first hydraulic fluid pressure;

a plurality of shift timing valves, including a 3-2 timing valve, and a low clutch timing value, which are to control timings of different shifts in speed ratio, each of said plurality of timing valves having an open position wherein a fluid passage therethrough is opened and a closed position wherein said fluid passage is closed and being shiftable between said open position and said closed position;

conduit means for fluidly connecting said 3-2 timing valve and said low clutch timing valve to said source to allow a flow of hydraulic fluid from said source to said 3-2 timing valve and said low clutch timing valve;

means, including a solenoid, for dividing said conduit means into a first section upstream thereof with respect to said flow of hydraulic fluid and a second section downstream thereof with respect to said flow of hydraulic fluid, said dividing means being operative to change said first hydraulic fluid pressure within said second section of said conduit means to a second hydraulic fluid pressure in response to said solenoid;

each of said shift timing valves having a chamber which is always in an uninterrupted fluid communication with all elements of said dividing means through said second section of said conduit means and being shiftable between said open position and said closed position in response to a change within said second section of said conduit means from said first hydraulic fluid pressure to said second hydraulic fluid pressure.

3. In a shift control system for an automatic transmission:

a source of a first hydraulic fluid pressure;
a 3-2 timing valve;
a low clutch timing valve, said 3-2 timing valve and said low clutch timing valve being put into operation in different control phases;
conduit means for fluidly connecting said 3-2 timing valve and said low clutch timing valve to said source to allow a flow of hydraulic fluid from said source toward said 3-2 timing valve and said low clutch timing valve;
each of said 3-2 timing valve and said low clutch timing valve having an open position wherein a fluid passage therethrough is opened and a closed position wherein said fluid passage is closed and being shiftable between said open position and said closed position,
means, including a solenoid, for dividing said conduit means into a first section upstream thereof with respect to said flow of hydraulic fluid and a second section downstream thereof with respect to said flow of hydraulic fluid, said dividing means being operative to change said first hydraulic fluid pressure within said second section of said conduit means to a second hydraulic fluid pressure in response to said solenoid;
each of said 3-2 timing valve and said low clutch timing valve having a chamber which is always in an uninterrupted fluid communication with said dividing means through said second section of said conduit means and being shiftable between said open position and said closed position in response to a change within said second section of said conduit means from said first hydraulic fluid pressure to said second hydraulic fluid pressure.

4. In an automatic transmission having a band brake and a low clutch:

a source of a first hydraulic fluid pressure;
a 3-2 timing valve communicating with said band brake, said 3-2 timing valve having a closed position wherein a first fluid passage for a discharge of hydraulic fluid from the band brake is closed and an open position wherein said first passage is opened;
a low clutch timing valve, said low clutch timing valve communicating with the low clutch, said low clutch timing valve having an open position wherein a second fluid passage for a discharge of hydraulic fluid from the low clutch is opened and a closed position wherein said second passage is closed;
conduit means for fluidly connecting said 3-2 timing valve and said low clutch timing valve to said source to allow a flow of hydraulic fluid from said source toward said 3-2 timing valve and said low clutch timing valve;
means, including a solenoid, for dividing said conduit means into a first section upstream thereof with respect to said flow of hydraulic fluid and a second section downstream thereof with respect to said flow of hydraulic fluid, said dividing means being operative to change said first hydraulic fluid pressure within said second section of said conduit means to a second hydraulic fluid pressure in response to said solenoid;
each of said 3-2 timing valve and said low clutch timing valve having a chamber which is always in an uninterrupted fluid communication with said dividing means through said second section of said conduit means and being shiftable between said open position and said closed position in response to a change within said second section of said conduit means from said first hydraulic fluid pressure to said second hydraulic fluid pressure.

* * * * *